(12) United States Patent
Anton

(10) Patent No.: US 10,853,880 B2
(45) Date of Patent: Dec. 1, 2020

(54) TRADE EXCHANGE SYSTEM AND METHOD

(71) Applicant: Trade Exchange Group, Inc., Chicago, IL (US)

(72) Inventor: Michael Anton, Chicago, IL (US)

(73) Assignee: Trade Exchange Group, Inc., New York, NY (US)

( * ) Notice: Subject to any disclaimer, the term of this patent is extended or adjusted under 35 U.S.C. 154(b) by 403 days.

(21) Appl. No.: 15/489,043

(22) Filed: Apr. 17, 2017

(65) Prior Publication Data

US 2018/0300809 A1    Oct. 18, 2018

(51) Int. Cl.
*G06Q 40/04*     (2012.01)

(52) U.S. Cl.
CPC .................................... *G06Q 40/04* (2013.01)

(58) Field of Classification Search
CPC ........ G06Q 40/04; G06Q 40/06; G06Q 20/02; G06Q 20/12
USPC .......................................................... 705/37
See application file for complete search history.

(56) References Cited

U.S. PATENT DOCUMENTS

| 8,577,765 | B2 | 11/2013 | West et al. | |
|---|---|---|---|---|
| 8,799,773 | B2 | 8/2014 | Reis et al. | |
| 2009/0307123 | A1 * | 12/2009 | Gershon | G06Q 40/04 |
| | | | | 705/37 |
| 2010/0138357 | A1 * | 6/2010 | Mufti-Bey | G06Q 40/06 |
| | | | | 705/36 R |
| 2010/0198716 | A1 | 8/2010 | Chatzky | |
| 2012/0130881 | A1 | 5/2012 | Chiang | |
| 2014/0040099 | A1 * | 2/2014 | Keitz | G06Q 20/12 |
| | | | | 705/37 |
| 2016/0085855 | A1 * | 3/2016 | Clark | G06F 16/3344 |
| | | | | 707/739 |
| 2016/0239918 | A1 | 8/2016 | Lambur et al. | |
| 2017/0206602 | A1 * | 7/2017 | Sallent | G06Q 40/04 |

FOREIGN PATENT DOCUMENTS

WO    WO-2012123026 A1 *   9/2012  ......... G06Q 30/0603

OTHER PUBLICATIONS

Florian Teschner & Tobias T. Kranz & Christof Weinhardt. The Impact of Customizable Market Interfaces on Trading Performance. Electron Markets (2015) 25:325-334. (Year: 2015).*
Webpage: https://www.investfeed.com/login, printed Apr. 17, 2017 (5 pgs.).
Webpage: https://stocktwits.com, printed Apr. 17, 2017 (5 pgs.).

\* cited by examiner

*Primary Examiner* — Virpi H Kanervo

(57) ABSTRACT

A trade exchange system and method provide transparency and accountability for each idea producer and each follower of each idea producer with respect to trades executed based on a trade idea circulated by the idea producer. The trade exchange system and method may use application-programming interfaces (APIs) to gather data from a brokerage entity in order to verify the trades executed in response to the trade idea by the idea producer and the follower.

27 Claims, 16 Drawing Sheets

Retirement 2:58 pm
@randyklein Trade #748

Hi Everyone, I think its time to buy Apple. The Iphone is amazing and its going to sell like hot cakes.

COUNT ME IN                    DISMISS

Retirement
@randyklein

2:58 pm
Trade #748

| Long | 100 | QID |
|---|---|---|
| Direction | Quantity | Stock |

| +$420.24 | +4.24% | $47.24 |
|---|---|---|
| $ Change | % Change | Trading at |

| Unlimited | $4500.00 | $45.00 |
|---|---|---|
| Max Profit | Max Loss | Entry $ |

PREPARE TO CLOSE

TRADE EXCHANGE SYSTEM AND METHOD

FIELD

The field relates generally to a system and method for assessing trades.

BACKGROUND

There is a significant industry that exists in which investors or investment advisors try to sell their ideas for investments to customers. The investment advisor typically receives a commission for each time that investment advisor convinces a customer to follow the investment advice. Almost everyone has been subjected to an investment advisor's communication about a new investment opportunity. These communications are often high pressure selling in which the investment advisor is incentivized to sell you the new investment opportunity due to the commission. The problem with the above method is that there is no transparency or accountability for the investment advisor or for the customer. Thus, the investment advisor can make unverifiable claims about the success of his/her investment tips and opportunities and it is difficult for a customer to assess the actual success rate of the investment tips and opportunities of the particular investment advisor. Similarly, a customer can make unverifiable claims about the investment advisor and his/her investment tips and opportunities, both positive and negative.

The investment advisor may be more generally known as an idea producer since the investment advisor is producing the idea for the investment, such as a stock purchase or sale. In addition to the investment advisor, the idea producer may also be any other person or entity that generates a new idea for an investment opportunity. For example, the idea producer may be a registered investment advisor (working at, for example, Ed Jones, Morgan Stanley, Meryl Lynch, etc.) or unregistered idea producers.

Modernly, many different idea publishers/producers use web conference systems, which can be manipulated to not show all the details, like real account numbers. The problem with this approach is when you are guiding someone and trading on a simulated account, the fills of the trades are not real, therefore the results are fake, yet the publisher is selling to the public that they are producing real results. Thus, these web conference systems provide unverifiable claims and a lack of transparency.

A significant number of idea producers rely on previous track records as evidence of the success of the particular idea producer. However, consumers want the ability to assess every idea that an idea producer sends to the particular customer and they want to see how an idea they've received has performed in their account as compared to the idea publisher's account. There is no known system that is independently tracking the results of a trade in both the idea publisher's account as well as the consumer's account for each investment idea. Furthermore, there is no system that will calculate the results on an equal weighted basis for both the publisher and the consumer. For example, if an idea publisher decides that a particular idea is extra special and therefore it deserves more attention (larger investment/larger lot) than that information should be tracked. No current system calculates that change in lot sentiment.

Other existing systems provide a chat room/trading room that show an idea publisher making trades, but there is no accounting for all the ideas on an equal weighted basis. An equal weighted basis means dollar for dollar what is the true rate of return. For example, when an investor looks at 20 trades, for example, if the investor put $1 in each trade, what would the return be for the trades, expressed as a percentage? In other words, different size lots for trades are not accounted for so that the customer can distinguish these different trades. Furthermore, the performance metrics of the idea publisher are not independently verified or easily accessible to a customer.

Some other systems exist that provide trade idea sharing, including StockTwits (a twitter for stocks) and Invest Feed. For example, with StockTwits, there is no real way to verify anything that the idea publisher claims so that a consumer will never know if the idea producer put their own money into the trade idea. Invest Feed allows portfolio integration but there is no mechanism for a customer to verify that the idea producer who suggests a trade idea actually makes a trade (known as taking a position) based on the trade idea. Thus, with Invest Feed, an idea producer could distribute a claim (a trade idea) and then wait to actually act on that claim. Thus, these systems and method have neither tracking of the results of the trade ideas nor any accountability for those trade ideas.

Many existing platforms do not show a follower (a customer that is following/acting on the trade idea of the idea producer) what the exact price, time and lot (investment size) of the trade that the idea publisher made to act on the trade idea and get into a position based on the trade idea. These types of platforms also do not show the follower if the idea publisher even took the trade with real money resulting in no accountability like the other systems.

The technical problem with providing the tracking of results and accountability has been that integration with brokerage firms was unavailable and therefore getting honest results about trades was impossible. While a customer was able to get a statement about the trade, manipulation was prominent thus reducing the veracity of the statement. Due to that manipulation, there is no trust in financial publishers or professionals. Furthermore, customers do not believe investment publisher or gurus because of this abuse and manipulation.

The field of investment advice has been fraught with problems for both the idea publisher as well as for registered investment personnel. For the idea publisher, the followers would blame the publisher for not producing results yet. In addition, the follower is often times the one that put in the trade wrong and then blamed it the error on the idea producer. When this occurs, there's a debate over who is at fault. It is desirable to provide a technical solution that can resolve this issue for idea publishers.

The registered investment personnel, when a licensed stock broker/investment advisor calls up a client to say he has a great idea, the customer debates the merits and the customer sometimes takes the trade. As time passes, a customer may want to a number of trade ideas that were provided by the registered personnel and the associated results of those trades. Trying to determine the results of the trades from memory or a statement from a broker to track each idea's performance is not realistic. Furthermore, it is even more unrealistic to track the equal weighted performance, when there are multiple trade lot suggestions. For the registered investment personnel, there is no accountability for the consumer who finally decides to act on the broker's recommendation, which end up being a loser, yet the previous 4 trade ideas were winners. In that scenario the broker is bad and at fault, yet that's not fair to the broker and his reputation. It is desirable to provide a technical solution that can resolve this issue for registered investment personnel.

DETAILED DESCRIPTION OF ONE OR MORE EMBODIMENTS

Figure 10:
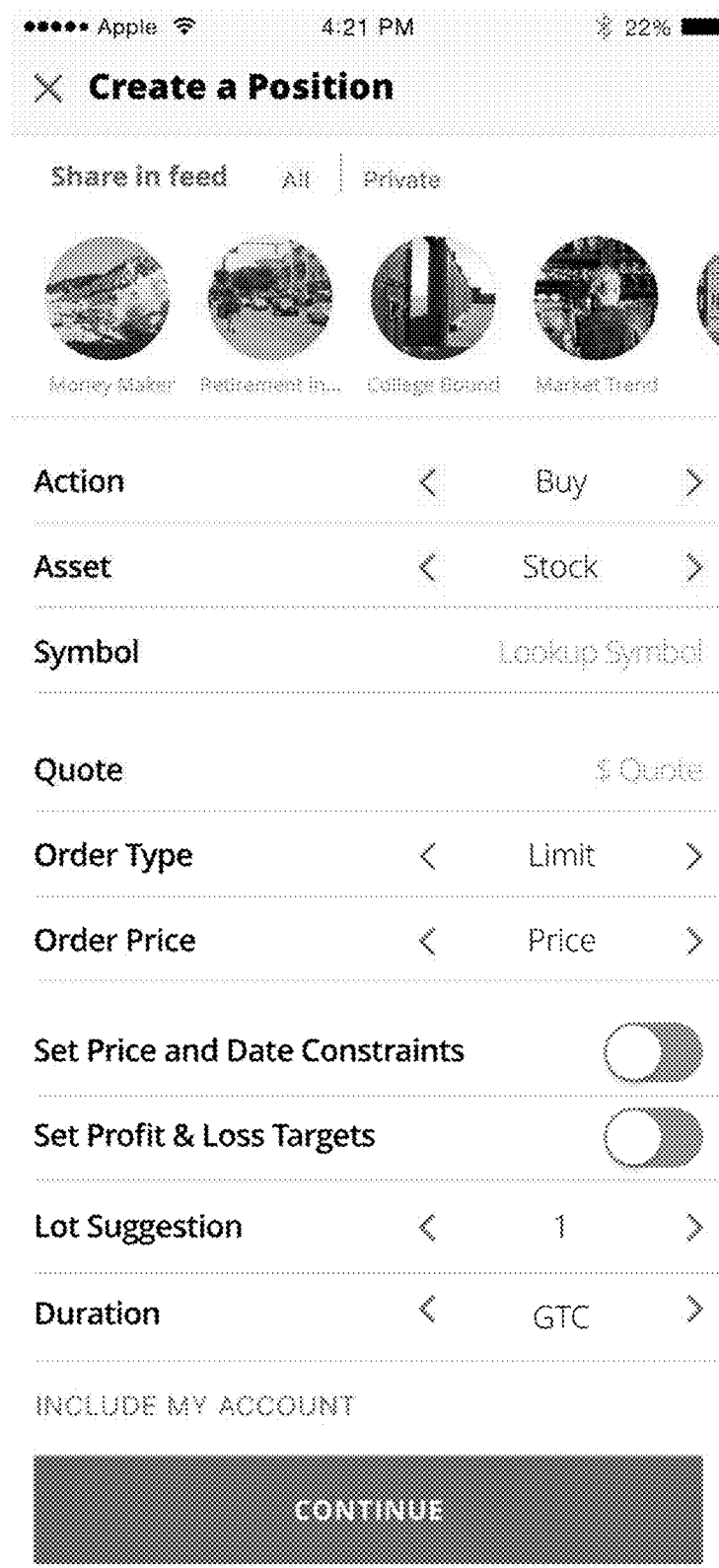
FIG. 10 illustrates an example of a user interface to create a new trade idea.
Figure 14:
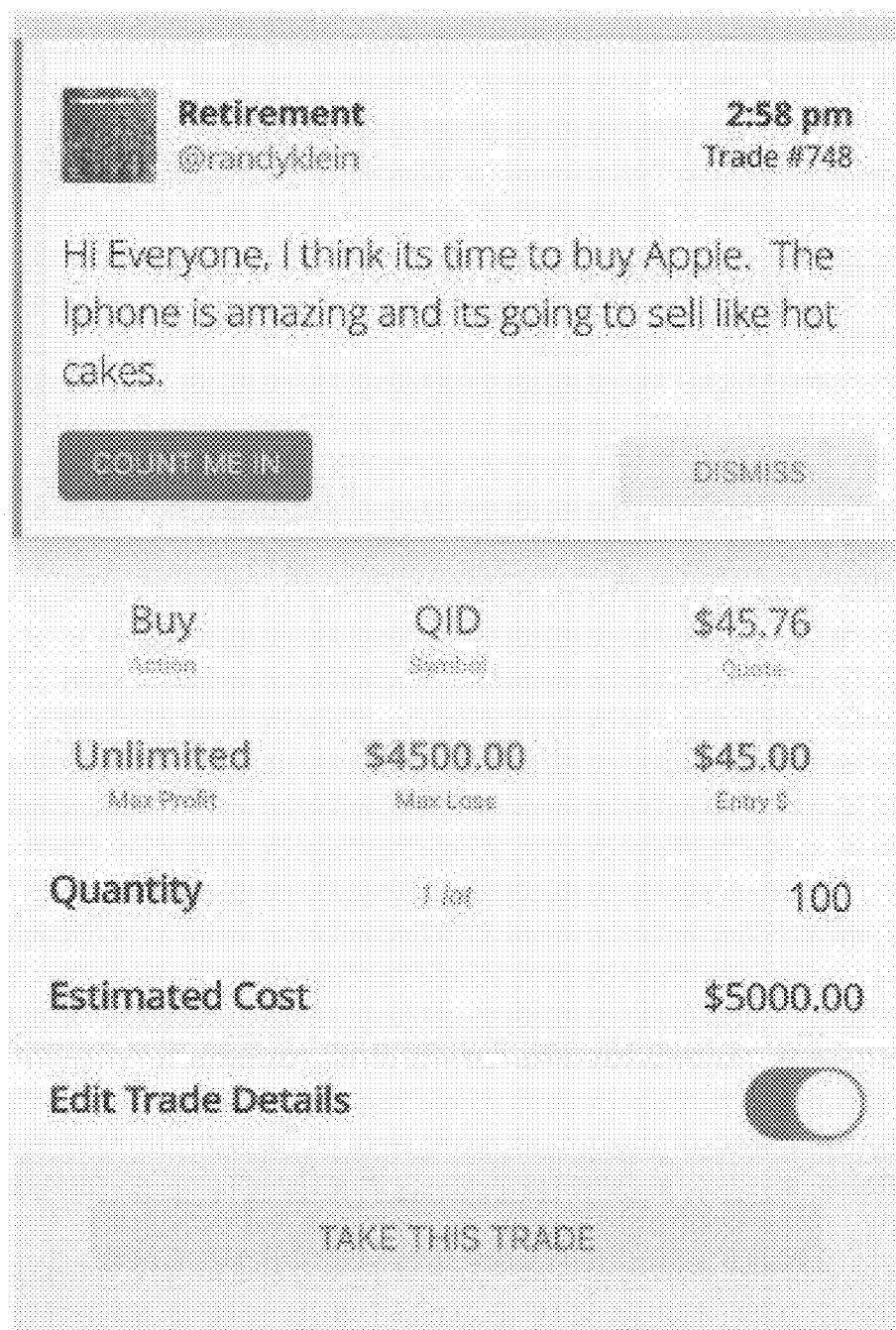

The disclosure is particularly applicable to a trade exchange system and method for stock trades and it is in this context that the disclosure will be described. It will be appreciated, however, that the system and method has greater utility since it may be used for other trade ideas for bonds, commodities, other securities, equity options, baskets of securities/portfolios (for example a mutual fund or other investment vehicle) and/or portfolio changes from A portfolio to B portfolio. The system and method may be used for tracking and providing transparency for trades with the same lot sizes (with a lot size being the number of shares of stock in the illustrative example or an amount of money invested in a trade idea), but may also be used for tracking and providing transparency for trades having different lot sizes that may indicate, for example, a different level of importance for a trade idea having larger lot size. This different in lot size may be known as the lot sentiment of the idea producer and is not tracked by the typical systems as described above. Examples of the lot sentiment (a number of lots of a security or stock to buy/sell in the investment advice) are shown in FIG. 10 showing trade advice position with a lot size of "1" and FIG. 14 showing a count me in user interface that includes the quantity (lot size) which is "1" that equates to 100 shares in the example in FIG. 14.

The system and method may be used to track and provide transparency for various different idea producers that may include unregistered idea producers and registered idea producers like brokers or investment advisors, such as personnel at Ed Jones, Morgan Stanley, Meryl Lynch, etc. An idea producer is a person, entity, etc. that publishes an idea for a trade while a follower is a person or entity that acts on the trade idea of an idea producer. Furthermore, although the example system described below is client server type architecture, the system may be implemented using various architectures, such as software as a service model/architecture, a cloud based architecture and the like.

The trade exchange system and method provides accountability and transparency for each of the parties including the idea producer and one or more followers who act on the trade idea of the idea producer. The trade exchange system and method also allows those idea producers to communicate with a plurality of followers about the trade ideas. The trade exchange system and method further addresses the problems described above for idea producers as well as registered investment advisors. Due to the accountability and transparency provided by the trade exchange system, the trade exchange system and method allows the claims (correct or nor) made by an idea producer or a customer/follower to be verified by the system and method.

The biggest problem for trade ideas and acting on an idea producer's trade idea is understanding whether the particular idea producer has been profitable with the trade ideas. When a follower receives ideas via the trade exchange system 100, everything is tracked and results are calculated as described below. In addition, the lot suggestion per idea is taken into account in order to calculate the equal weighted/fair results per idea producer. In the system, the results of the idea producer's trades are compared to the results of the follower, which tells the follower if the idea producer is making them any money, or not. The results page of the system also tells the publisher if the follower is able to act on the idea, if the follower actually acted on the trade idea and if the follower made any money on that person's trade ideas. Followers can use the results page to see how many ideas they received from an idea producer, how many ideas they acted on and the related results. Users can then dig deeper and see the exact trade times, fill prices and if the idea producer put their money behind the idea or not. All of the above is verified by the exchange. Otherwise there is no real verification, hence the problem being solved by the system and method described below.

Figure 1:
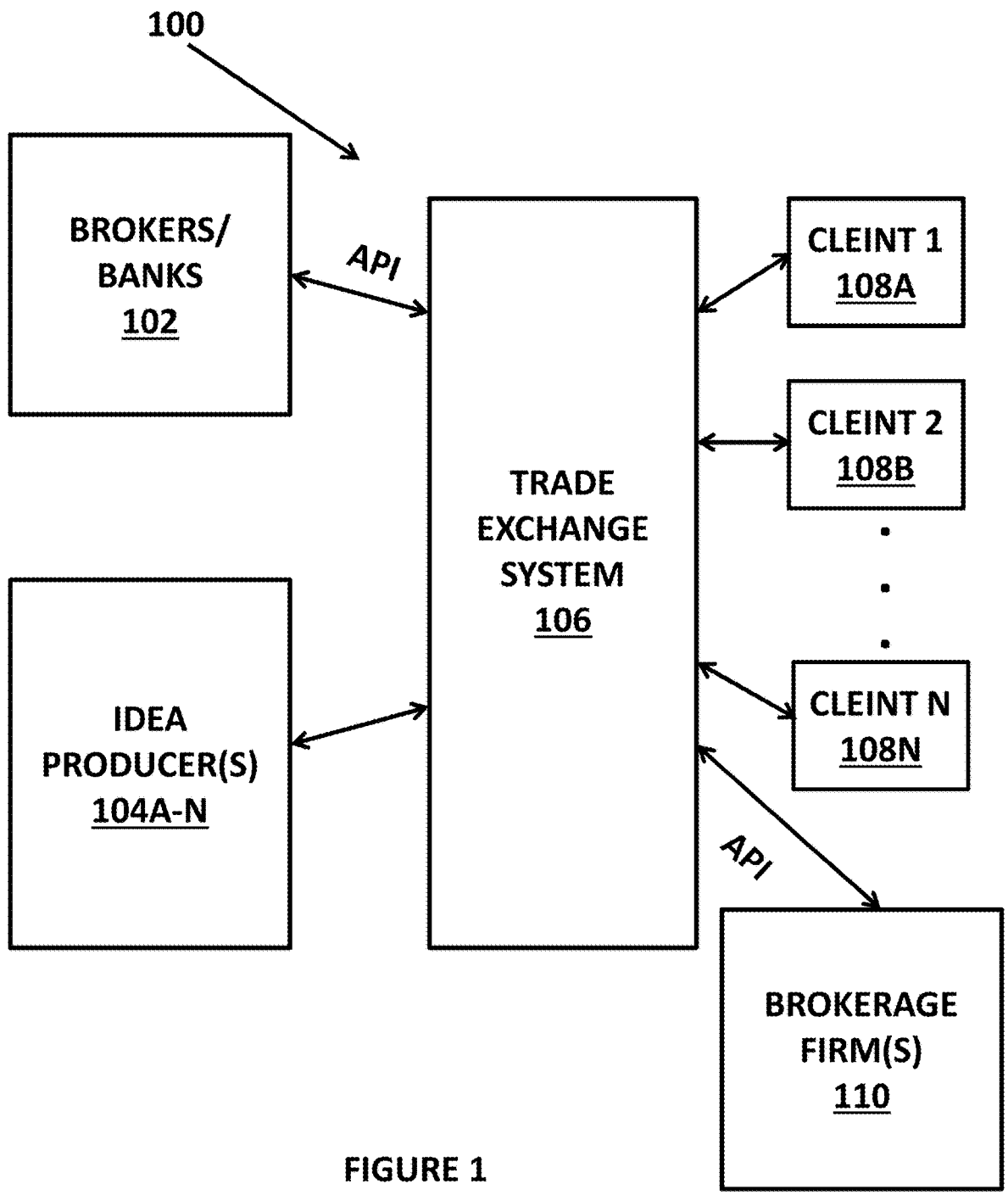
FIG. 1 illustrates an embodiment of a trade exchange system.

FIG. 1 illustrates an embodiment of a trade exchange system 100 that provides transparency and accountability for trade ideas between one or more idea producer(s) 104A-104N and one or more followers (client 1 108A, client 2 108B, . . . , client N 108N), both of which take a position (make a trade) based on the trade idea. Each idea producer may be an entity, person, etc. that is a source of a trade idea (e.g., buy 100 shares or Microsoft in the illustrative stock trading example). The trade ideas and trades made by each idea producer may be tracked by the system 100 so that a follower is able to review the trade ideas and trades. Each follower may be a person, entity, etc. that receives one or more trade ideas from one or more idea producers and take a position (make a trade) based on the trade idea. The system 100 allows each follower to review the record of trade ideas and trades of each idea producer when determining whether or not to take a position and memorialize the trade decision of the follower. Thus, the system 100 provides transparency and accountability both for the one or more followers and the one or more idea producers using a technology solution described below in more detail.

Each idea producer 104A, . . . , 104N may be a computer system that permits each idea producer to interact with a trade exchange system 106 over a communications path. For example, each idea producer may submit trade ideas to the trade exchange system, may review/view user interfaces generated by the trade exchange system (described below in more detail) and may take a position based on their own trade idea. Each idea producer 104 system may have at least one processor, memory, persistent storage, such as flash memory or a hard disk drive, user input/output devices, a display and communications circuits for establishing a connection and exchanging data with the trade exchange system 100. For example, each idea producer system may be a personal computer, a laptop computer, a smartphone device, a terminal device, a tablet computer and the like. In other embodiments, each idea producer system 104 may be a specialized piece of hardware that is uniquely created for the purpose of interacting with the trade exchange system 100. Each idea producer 104 system may further have an application, such as a browser application, downloaded application, mobile application, etc. that is executed by the processor and manages the connection and exchanging data with the trade exchange system 100. In different embodiments, the system may make the application available in HTML (web page with a browser), the mobile apps and wearable apps like an application that may executed on a smartwatch device like the Apple iWatch or Android operating system based watches. For example, in client server type architecture, the application may be a browser application that uses a HTTP or HTTPS data protocol and HTML language to connect to the trade exchange system and exchange data with the trade exchange system. The trade exchange system 100 may host a plurality of idea producers who each submit multiple trade ideas to the system and each idea producer may have a plurality of followers that act on the trade idea of the particular idea producer. The system 100 may have each idea producer sign up for the system 100 (including providing access to the brokerage account of the idea producer) and may display the trades for a plurality of idea producers and their followers.

Each follower 108A, . . . , 108N may be a computer system that permits each follower to interact with a trade exchange system 106 over a communications path. For example, each follower may receive trade ideas from one or more idea producers, may review/view user interfaces generated by the trade exchange system (described below in more detail) and may take a position based on the trade idea. Each follower 108 system may have at least one processor, memory, persistent storage, such as flash memory or a hard disk drive, user input/output devices, a display and communications circuits for establishing a connection and exchanging data with the trade exchange system 100. For example, each follower system may be a personal computer, a laptop computer, a smartphone device, a terminal device, a tablet computer and the like. In other embodiments, each follower system 108 may be a specialized piece of hardware that is uniquely created for the purpose of interacting with the trade exchange system 100. Each follower 108 system may further have an application, such as a browser application, downloaded application, mobile application, etc. that is executed by the processor and manages the connection and exchanging data with the trade exchange system 100. For example, in client server type architecture, the application may be a browser application that uses a HTTP or HTTPS data protocol and HTML language to connect to the trade exchange system and exchange data with the trade exchange system. The system 100 may have each follower sign up for the system 100 (including providing access to the brokerage account of the follower) and may display the trades for a plurality of followers and the idea producers being followed by each follower.

The system 100 may also have a trade exchange system 106 that acts as an intermediary between the one or more idea producers and the one or more followers to provide transparency and accountability for trade ideas proffered by each idea producer. The trade exchange system 106 may be implemented using one or more computing device elements, such as one or more processors, one or more storage devices, a blade server, a server computer, an application server, a database server, etc., but the trade exchange system 106 may also be implemented using specialized hardware optimized for the functions and operations of the trade exchange system 106 that may include, for example, unique application programming interface processors for each broker/bank 102 and each brokerage firm 110 that provide the transparency and accountability for trade ideas proffered by each idea producer as described below. Each elements of the trade exchange system 106 (shown for example in FIG. 3) may be implemented in software or hardware. When any element is implemented in software, the element, such as an API processor or trade data analyzer in FIG. 3, may comprise a plurality of lines of computer code/instructions that may be executed by a processor of the computing device elements to perform the functions and operations of the particular element of the trade exchange system 106. When any element is implemented in hardware, the element, such as an API processor or trade data analyzer in FIG. 3, may comprise a hardware device, such as for example a programmable logic device, microprocessor, microcontroller, etc. or a specialized piece of hardware that is uniquely created for the purpose of interacting with the trade exchange system 100 to perform the functions and operations of the particular element of the trade exchange system 106. The trade exchange system 106 may perform trade analysis for each idea producer trade idea, gather data about each trade through APIs and provide a summary of the trade analysis to each idea producer and each follower as described below that provides the transparency and attribution for the trades. The trade exchange system 106 may further comprise storage (implemented in hardware or software) that store the various trade data, user data (both followers and idea producers), computer code/instructions when the elements of the trade exchange system 106 are implemented in software and other pieces of data. For example, the storage may store a set of credentials for each user of the system (followers and idea producers) that may be used to access the brokerage account of the user using the API interface engine as described below.

The system 100 may further comprise one or more brokers/banks 102 and one or more brokerage firms 110 that are coupled to the trade exchange system 106 as shown. Each of these systems are coupled to the trade exchange system 106 using APIs that interact with one or more interface processor(s) of the trade exchange system shown in FIG. 3. The API access retrieves the trade data in real time which validates the trade times, prices, the amount bought or sold and if there even was a purchase linked to the idea, made by the idea producer. The API interfaces are not available to the public and takes an extremely experienced "trading" programmer to develop. The API access to all the major brokerage firms allow the system to include the real time trade data for the vast majority of self-directed investors making it a holistic solution for the masses. The fact that the system can ensure the data has not been manipulated by anyone is also important. Thus, the APIs allow the trade exchange system to gather data about each trade made by an idea producer 104 or follower 108 based on a trade idea for an idea producer so that the trade data may be analyzed and then presented to each of the idea producer 104 or follower 108 to provide the transparency and accountability for the trade idea as described below in more detail.

Figure 2:
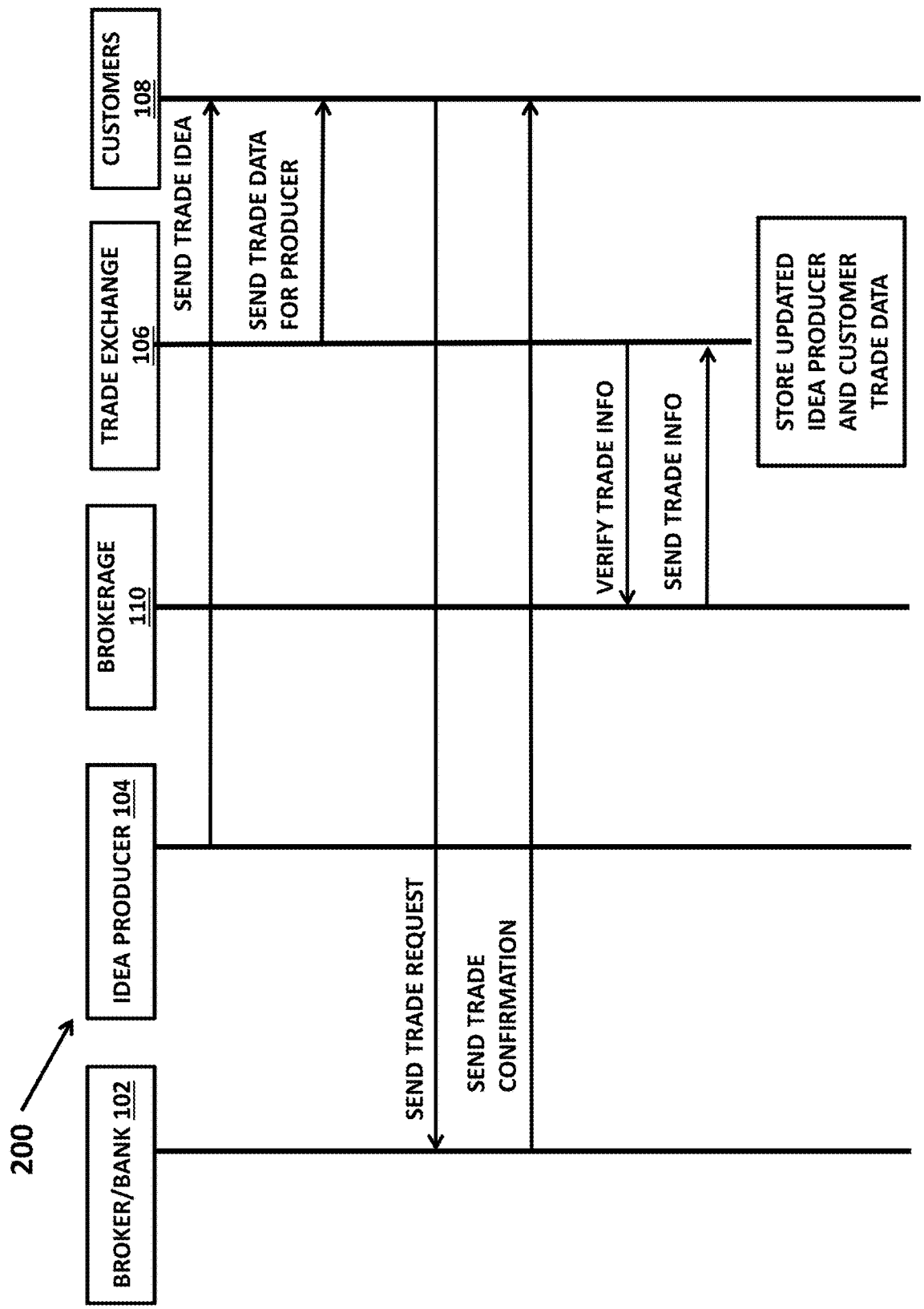
FIG. 2 illustrates an example of a trade exchange method.

FIG. 2 illustrates an example of a trade exchange method 200 for a particular new trade idea generated by a particular idea producer 104 so that this process would be performed for each trade idea for each trade producer 104. The method 200 may be performed by the system 100 shown in FIG. 1, but may also be implemented using other systems and devices. In the method, the idea producer 104 may generate new trade idea that is communicated, through the trade exchange system 106 to each follower 108 of the idea producer. In some embodiments, the set of followers for a particular idea producer may be set/established by the particular idea producer and the system may store the set of followers for each particular idea producer. The system may provide the idea publisher or an administrator of a community feed (a community feed is one where every person can contribute to the pool of new ideas) the ability to invite, manage, and charge a subscription rate for feed access. The administrator of either a Private Feed (published/guru feed where only the admin can contribute the pool of ideas) or community feed can use this platform as a tool to manage a business or group. The system and method may be used by people to manage their business on this platform, the business of selling ideas or managing a group of like-minded investors/traders. The trade exchange system 106, based on the new trade idea, may analyze the trade data for the idea producer (including past trade ideas) and generate a result page for each follower 108 that contains data about the trades made by the particular idea producer (examples of which are shown in FIGS. 5-9) that provided transparency and accountability. Specifically, the trade data (that includes the data from the banks and brokerages) displayed in the results page shows the actual results of trades (both by the idea producer and the followers) made based on previous or current trade ideas so that everyone can review the actual trade data which leads to transparency and accountability for both the idea producer and the followers that solves the problems with trading discussed above in the background.

In response to the trade idea and the trade data in the results page, a follower may send a trade request to their bank/brokerage 102 and the bank/brokerage 102 may send a trade confirmation indicating that a trade was made (that is based on the trade idea). The method 200 however provides a feedback mechanism so that the actual trade data may be displayed in the results page to both the idea producer and the follower. Thus, the trade exchange system 106 may verify the trade information with the brokerage 110 and, using the APIs, gather the trade information about the trade that was just executed. The trade exchange system 106 may then analyze that trade data, store the data in the storage associated with the trade exchange system 106 and then update the trade data based on the recent trade so that the updated trade data may be communicated to each of the idea producer and follower(s). Thus, the system is continuously updating the trade data so that the results page generated and presented to each of the idea producer and follower(s) is current and shows the current trade statistics which further provides the transparency and accountability for both the idea producer and the followers that solves the problems with trading discussed above in the background.

Figure 3:
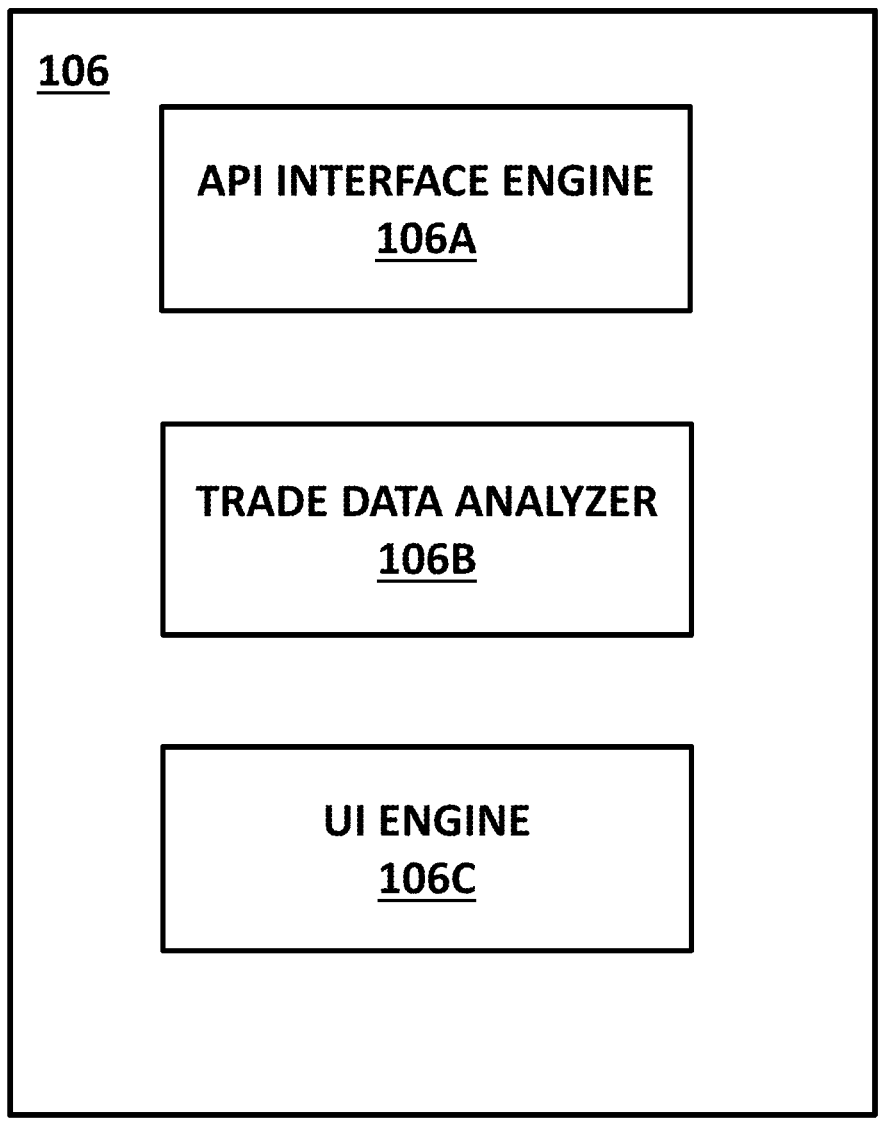
FIG. 3 illustrates more details of the trade exchange backend system that is part of the system in FIG. 1.

FIG. 3 illustrates more details of the trade exchange backend system 106 that is part of the system in FIG. 1. As described above, each of these elements of the trade exchange system 106 may be implemented in software or hardware. The trade exchange system 106 may further comprise an API interface engine 106A that requests and receives the trade data from the bank(s)/broker(s) 102 and the brokerage(s) 110 using an API. The API for each of the bank(s)/broker(s) 102 and the brokerage(s) 110 may be unique and the API interface engine 106A may have one or more sub-modules that handle each API. In the system, each API may be used, once a trade has occurred by a follower or an idea producer, to extract, in real time, trade data about the trade including described below. For example, if a particular follower or idea producer uses brokerage A (and has provided access credentials to the trade exchange system), the API interface engine 106A may use the API for brokerage A to retrieve the actual trade data. Similarly, if a particular follower or idea producer uses brokerage B and C (and has provided access credentials to the trade exchange system), the API interface engine 106A may use the API for brokerages B and C to retrieve the actual trade data. In the trade exchange system, the real time retrieval of the trade data may occur when each trade for a trade idea is executed. The API interface engine 106A may also then normalize the trade data received using each API and forward the trade data onto other elements of the trade exchange system. For example, the trade exchange system may display the trade data and/or use the actual trade data to calculate the trade statistics as described below.

The trade exchange system 106 may further comprise a trade data analyzer 106B. The trade data analyzer may receive the new trade data from the API engine 106A or retrieve prior data stored in the storage and analyses that trade data as described in more detail in FIG. 4. The analyzed trade data may be stored back into the storage and/or provided to a UI engine 106C that may then generate the results page for one or more of the idea producer and the follower(s). The trade data analyzer 106B may perform extremely difficult calculations, which include lot parameters for true IRR (internal rate of return) and accountability. In certain embodiments of the system, the system may calculate how many trades are profitable, how many trades are not profitable, the win to loss ratio of all of the trades (winning trades/total trades) and/or an increase or decrease in notional value across open and closed positions (such as $ change=(all closed position net gain or loss)+(all current open net gain or loss). The system may perform those calculations across numerous, if not hundreds of open and closed positions which is difficult. The system may also determine a percentage gain with multiple, 10, 20, 50 100 open positions as well as closed positions. In the above determinations, the system may take the lot suggestion into account when the follower enters in their quantity so that the user knows how many shares to invest.

The trade exchange system 106 may further comprise the user interface (UI) engine 106C that may generate a results page to each idea producer and each follower of each trade producer. The UI engine 106C may receive trade data from the trade data analyzer 106B and/or retrieve trade data from the storage in order to generate the results page. Examples of the results page are shown in FIGS. 5-9 described below. Note that each results page from each idea producer and his or her follower(s) is unique since the trade data used to generate each results page is unique to that particular idea producer.

Figure 4:
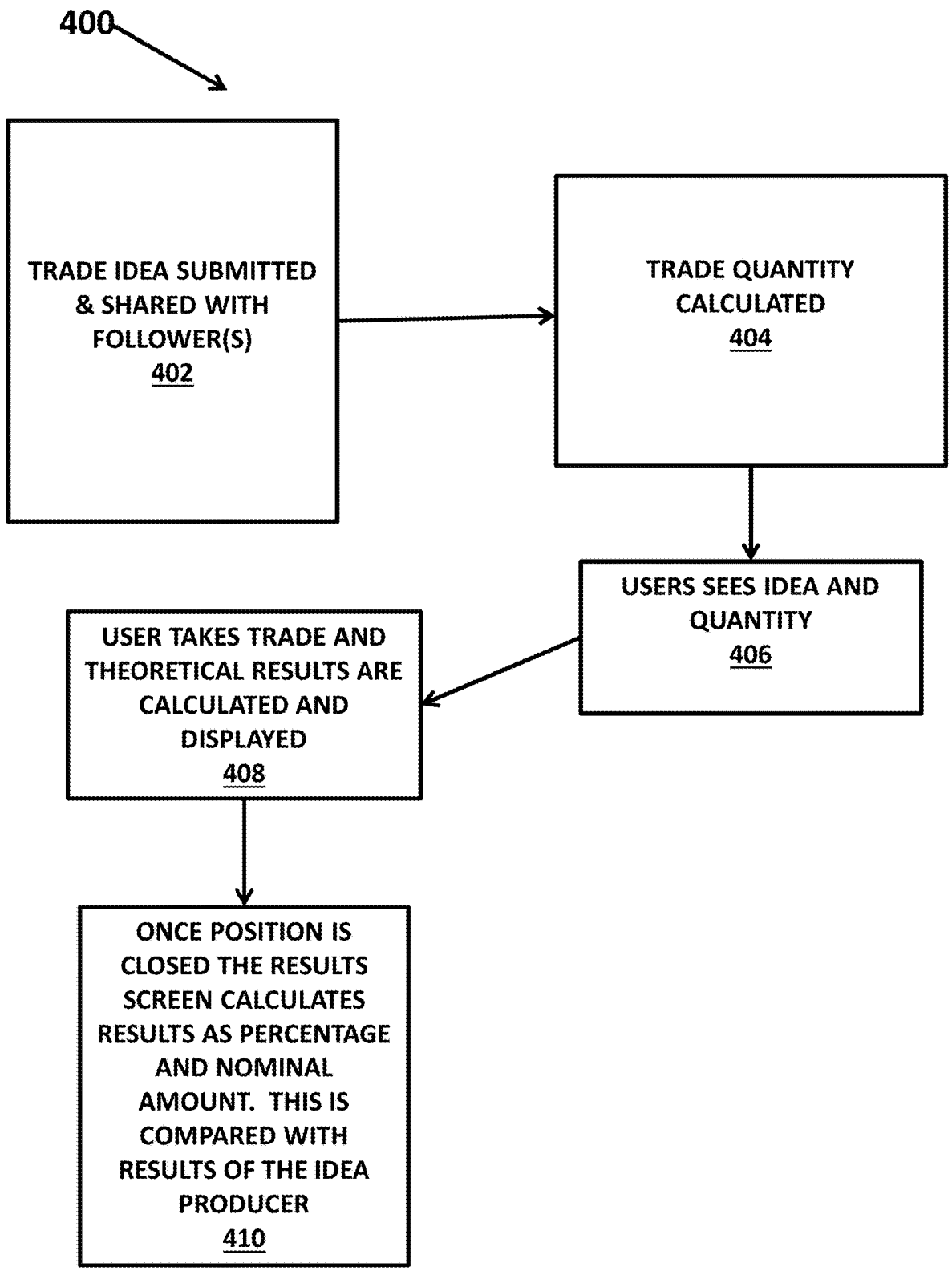
FIG. 4 illustrates a method for trade data analysis that is part of the trade exchange method shown in FIG. 2.

FIG. 4 illustrates a method 400 for trade data analysis that is part of the trade exchange method shown in FIG. 2. In some embodiments, the method 400 may be performed by the trade analysis element 106B shown in FIG. 3, but may also be performed using other devices and elements. In the method, a trade idea may be submitted and shared with the follower(s) (402). The trade idea, in one embodiment for stock trades, may include the security to be traded, a price at which to trade the security, time constraints for the trade. For example, the trade idea may have an expiration date (the idea is only valid until a certain date.) For example, the idea is only valid as long as the particular security price is above or below a certain price and the idea is only valid as long as either 1 or 2 of XYZ security (S& P for example) is greater than or less than price A and a lot suggestion (e.g., a number of shares to be traded). The trade idea may be for a sale of the security, a short sale of a security, a purchase of a security and the like. In other embodiments in which the trade exchange system is used for other items/things that may be traded, the trade idea contents may be different.

When the trade idea information is received, a trade quantity may be calculated. The trade quantity may be calculated by taking into account default investment amount, lot suggestion, security and account margin restrictions. The parameters may include a number of shares or dollar size. For example 1 lot=100 shares, then if the idea publisher recommends 4 lot for Sprint (8.37) then the calculation would be 100*4*8.37. If the default was $1000.00, the calculation would be 1000*4=$4000/8.37=477.89, the system would then round down to the nearest whole number to compute—477 shares as the number suggested to buy.

The results page for each user may be generated based on the trade idea and the calculated trade quantity (406). The display of the trade idea and the quantity achieves two benefits (and helps ensure the transparency and accountability). First, the display of the trade idea and the quantity makes it easier for a user to implement the trade idea (since all of the required information is displayed to the user) since it removes some barriers to following the trade idea. Second, the display of the trade idea and the quantity ensures that the strategy in the trade idea is followed correctly by each follower to reduce any miscommunication so that each follower is held accountable for the trade that the follower executes, especially if the follower does not follow the strategy of the trade idea.

The user may then execute the trade and a set of theoretical results of the trade may be calculated and displayed (408). For example, based on the example above, if a user bought 477 shares of spring for approximately $4,000 the system would take that data and calculate what a max loss. For example, if there was not stop loss than the max loss would be ~$4000 or the entire investment. If there was a stop loss target in the idea, such as $8 per share that would be the stop loss target, then the max loss would be 477*(8.37−8). To calculate a max profit, the system may determine if there is a profit target, and if not, the max profit is unlimited. If there was a profit target of $9.00, for example, then the calculation would be (9−8.37*477). The system can adjust the maximum profit and loss calculations in real time as a user adjusts the quantity of the trade order. The system may also generate the above results if a user/investor is selling short. The method may, once the position for the trade is closed, determine a set of results of the trade as a percentage and nominal amount (410). Once the theoretical value and results discussed above are replaced with real trade data, the calculation move from theoretical to actualized may be adjusted based on the actual fill price for the trade. The results page generated by the system and method may include the above determined trade data so that the results may be compared to the results of the idea producer (since the idea producer may have made the same trade based on the trade idea. The calculation of the results and the display of those results ensure accountability of the idea producer since each follower can see the comparison of the results by the idea producer for the trade idea.

Figure 5:
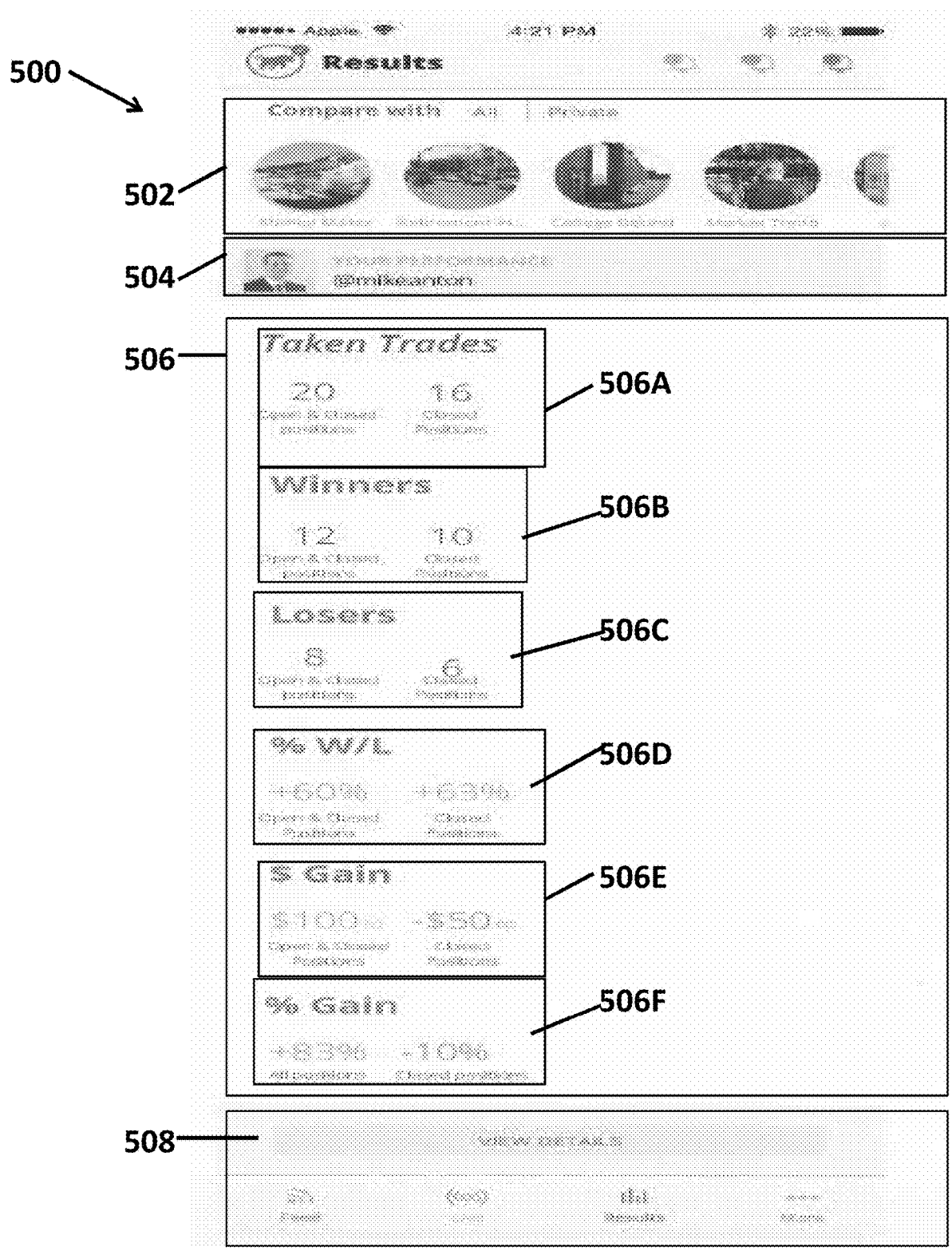
FIG. 5 illustrates an example of a result user interface generated by the trade exchange system that shows a user the one or more trade ideas and the statistics about the trade idea(s)

FIG. 5 illustrates an example of a result user interface 500 generated by the trade exchange system that shows a user the one or more trade ideas and the statistics about the trade idea(s). This screen shows the user how many ideas they have taken or acted upon while using the platform. This includes ideas that originate from others as well as ideas that they came up with themselves. The results page may include a comparison portion 502 that allows a user (a follower) to select one or more different idea producers to compare the trade data. The results page further comprises a user portion 504 that identifies the user who is requesting the results page, a trade data portion 506 that displays the various trade data and a menu portion 508 that allows the user to control the user interfaces that are generated by the system. The menu portion 508 may include, for example, a view details button so that the user can drill down on any of the trade data, a results button to select the results page (as shown in FIG. 5) and other control buttons. The results user interface thus provides and displays the "details" of the actual trade data and the details of the actual trade data may include, for example, when someone bought, if they bought, how much was purchased or sold, at what price the trade actually occurred (e.g., the price at which the user got their order filled.) This display of the details of the trade data would not be possible without the above described APIs that also allow the details of the actual trade to be displayed in real-time.

The trade data portion 506 may include various trade data for the user for a particular idea producer and the trade data may be retrieved from the external sources using the API or generated/calculated by the trade exchange system as described above and then displayed on the results page. For example, the trade data portion 506 may include a taken trades portion 506A that shows a total number of positions (open and closed positions) as well as a number of closed positions. When someone wants to open a position they are saying that they want to put money on the line with the intention of making a profit by betting that the stock goes up or down. When someone puts money on the line and "takes a position" they are committing funds to an idea with the intention of making a profit. When someone wants to close a position they are requesting to sell the position and turn the ownership stake in the trade idea back into cash. Thus, closing a position is when people get their money back, or, as much of their money is left or their money plus a profit. The trade data portion 506 further may include a winners portion 506B that displays winning trades of the user (trades in which the user made money) with both total number of positions and closed positions and a losers portion 506C that displays losing trades of the user (trades in which the user has lost money) with both a total number of positions and closed positions. The trade data portion 506 further may include a won/loss percentage portion 506D that displays a win/loss percentage (generated by the system) for both a total number of positions and closed positions. The trade data portion 506 further may include money gained portion 506E that displays the gain or loss of the user (calculated by the system) for the trades for both a total number of positions and closed positions. Unlike the conventional system that uses a simulated account as described above, the system and method validates claims that a purchase was made with real money (using the APIs) and thus solves the problem using the APIs and trade exchange system that form the technical solution to the problem. The trade data portion 506 further may include a percentage gained portion 506F that displays the percentage gain or loss of the user (calculated by the system) for the trades for both a total number of positions and closed positions.

Figure 6:
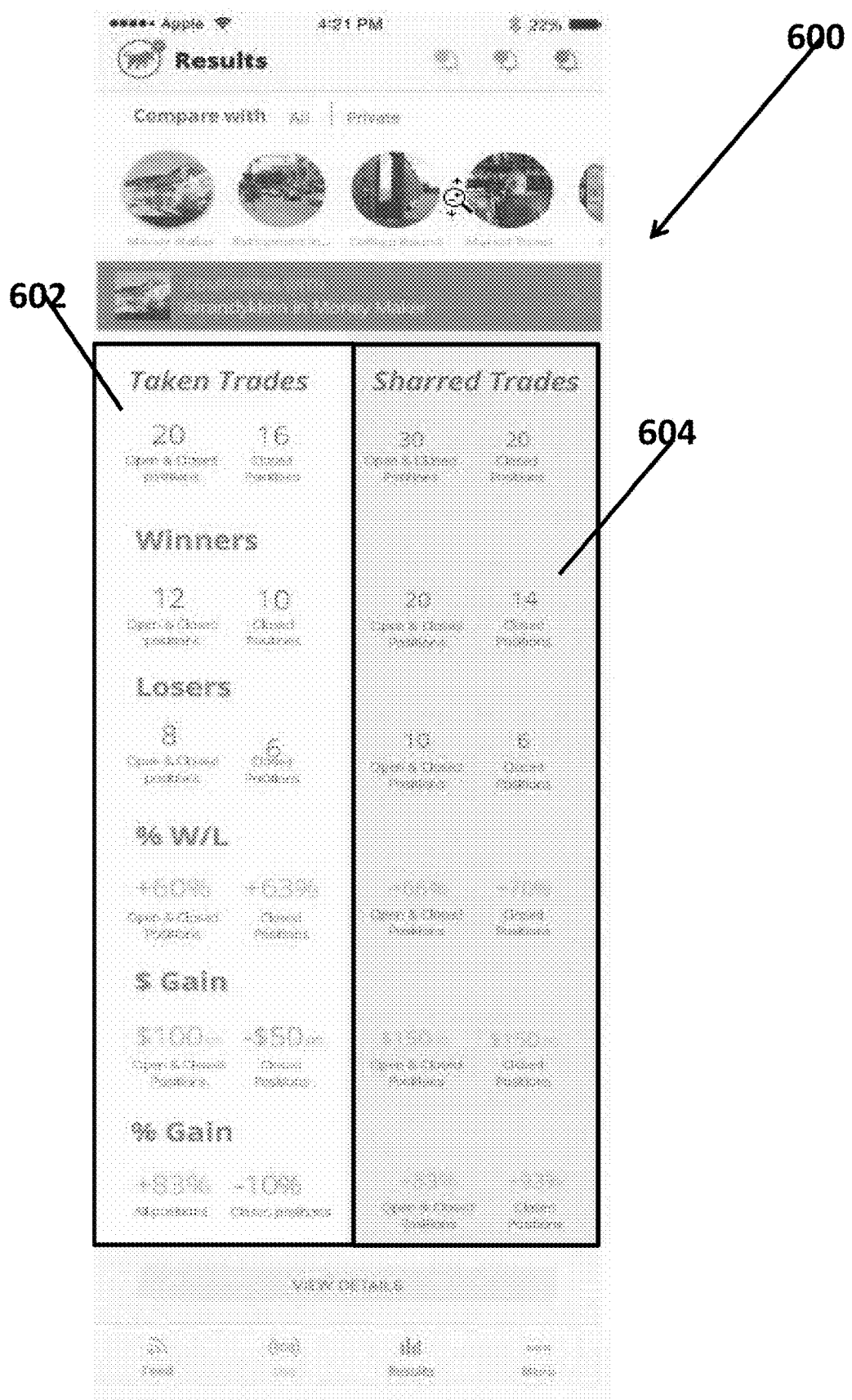
FIG. 6 illustrates an example of a result user interface generated by the trade exchange system that shows trades for a particular idea producer feed.

FIG. 6 illustrates an example of a result user interface generated by the trade exchange system that shows trades for a particular idea producer feed compared to a particular selected idea producer. In this screen, there is a user trade data portion 602 that displays the user's trade data 602 as before with the same categories of trade data as shown in FIG. 5 and an idea producer portion 604 that displays the trade data for the idea producer (with the same trade data categories as those displayed for the user) so that the user can compare his/her trade data with the trade data of the idea producer for the trades made by the idea producer. To populate the idea producer portion 604, the user may select one of the feeds (one of the circles in the user interface) from an idea producer from the comparison portion 502 shown in FIG. 5. Money Maker was selected in the example in FIG. 6. The idea producer portion 604 may display the number of trade ideas a particular feed sent the user. The user portion 602 displays an account of the ideas, from that particular feed, that the user acted upon and the results of those trades. Thus, the user can compare their performance with the performance of the idea producer. For example, did the idea producer make more or less money on the exact same trade idea? If the user wants to get granular and see the trade time, price, and quantity or if the idea producer put money behind the idea then they select the "View Details" button at the bottom of the user interface.

Figure 7:
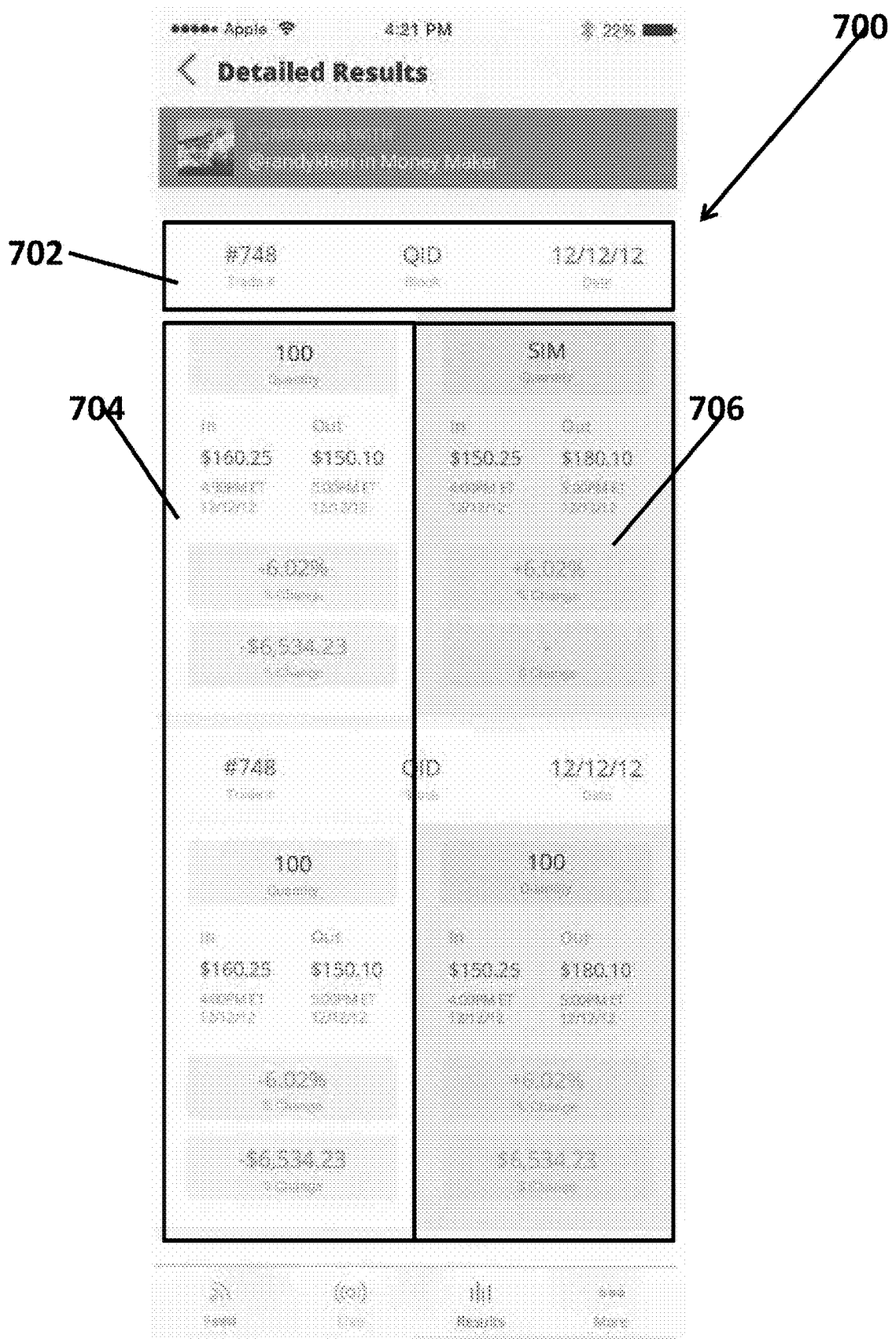
FIG. 7 illustrates an example of a result user interface generated by the trade exchange system that shows the actual trade data for a particular user and the idea producer.

FIG. 7 illustrates an example of a result user interface 700 generated by the trade exchange system that shows the actual trade data for a particular user and the idea producer. This user interface 700 is displayed to the user when the user clicks on the view details button so that the user can see the actual trade data for both the user and the idea producer so this page allows the user to see why their trade results differ from publisher. This page also illustrates to the user if the publisher put money behind the idea. The example in FIG. 7 shows trade data for a particular trade for QID stock made on Dec. 12, 2012 in a trade display portion 702. The user interface has a user trade data portion 704 and an idea producer portion 706 side by side with the various trade data shown side by side as well for comparison purposes. The knowledge of the data shown in FIG. 7 is a big deal to the user because many users are not honest with their results and this user interface helps both the idea producer and their follower. Furthermore, this user interface holds the idea producer accountable. In FIG. 7 (and subsequent figures) the user interface may also display buying and selling price (in and out) for the stock, the time of both of the in and out trades, the percentage change and the amount of change due to the trade.

Figure 8:
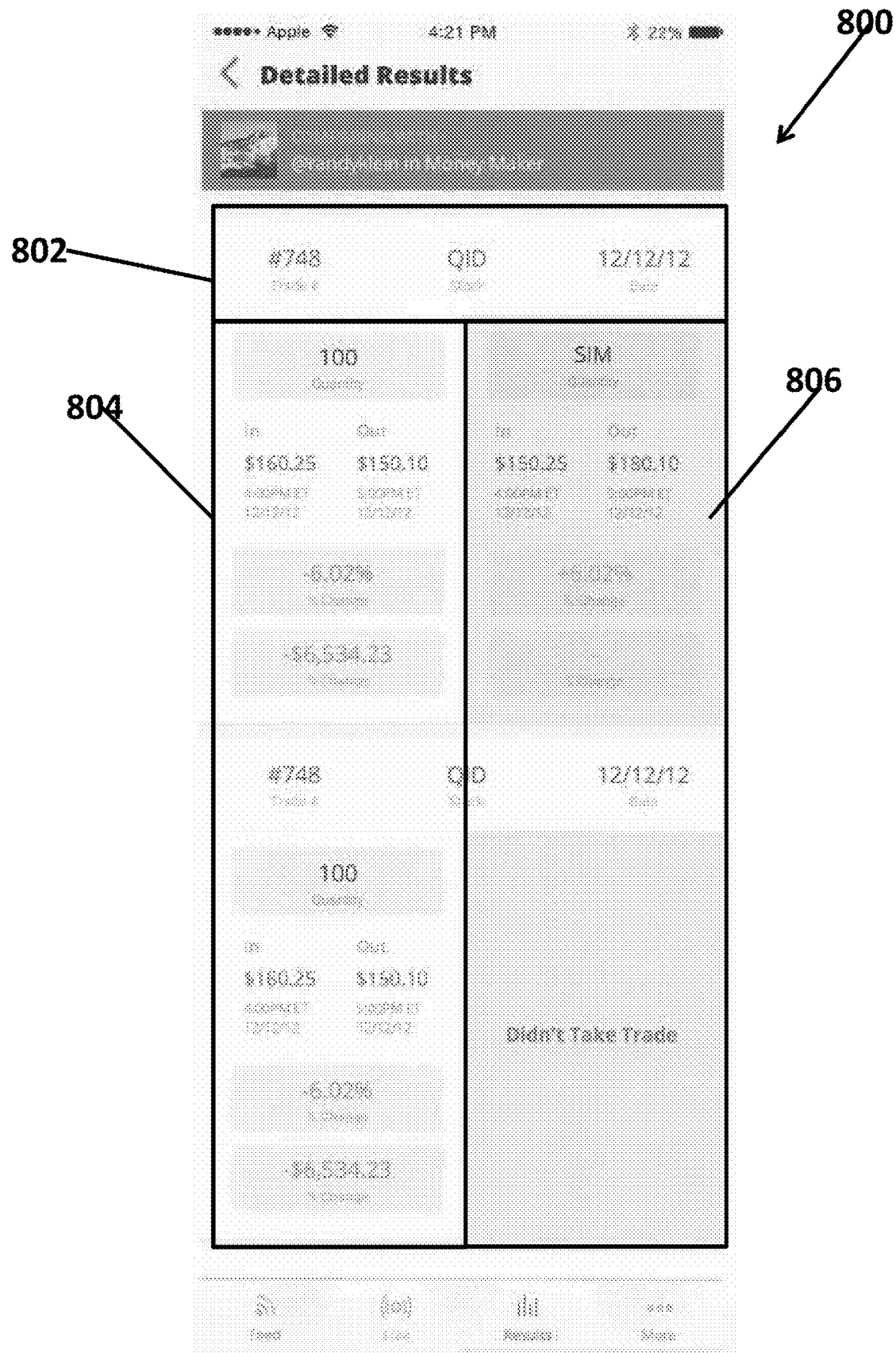
FIG. 8 illustrates an example of a result user interface generated by the trade exchange system displayed to an idea publisher showing the trades of the idea publisher and the follower.

FIG. 8 illustrates an example of a result user interface 800 generated by the trade exchange system displayed to an idea publisher showing the trades of the idea publisher and the follower. The example in FIG. 8 shows trade data for a particular trade for QID stock made on Dec. 12, 2012 in a trade display portion 802. The user interface has an idea publisher trade data portion 804 and a follower data portion 806 side by side with the various trade data shown side by side as well for comparison purposes. This user interface allows the publisher to quickly see if the follower acted on the idea they provided. In the example in FIG. 8, the particular follower did not take/act on the particular trade idea for QID stock. The user interface also shows the idea producer what exactly the follower did, when they did it and how close they were to actually implementing the ideas as instructed. This user interface (that includes generated trade data) makes the follower accountable for following the ideas/advice of the idea provider. Like FIG. 7, the user interface may also display buying and selling price (in and out) for the stock, the time of both of the in and out trades, the percentage change and the amount of change due to the trade.

Figure 9:
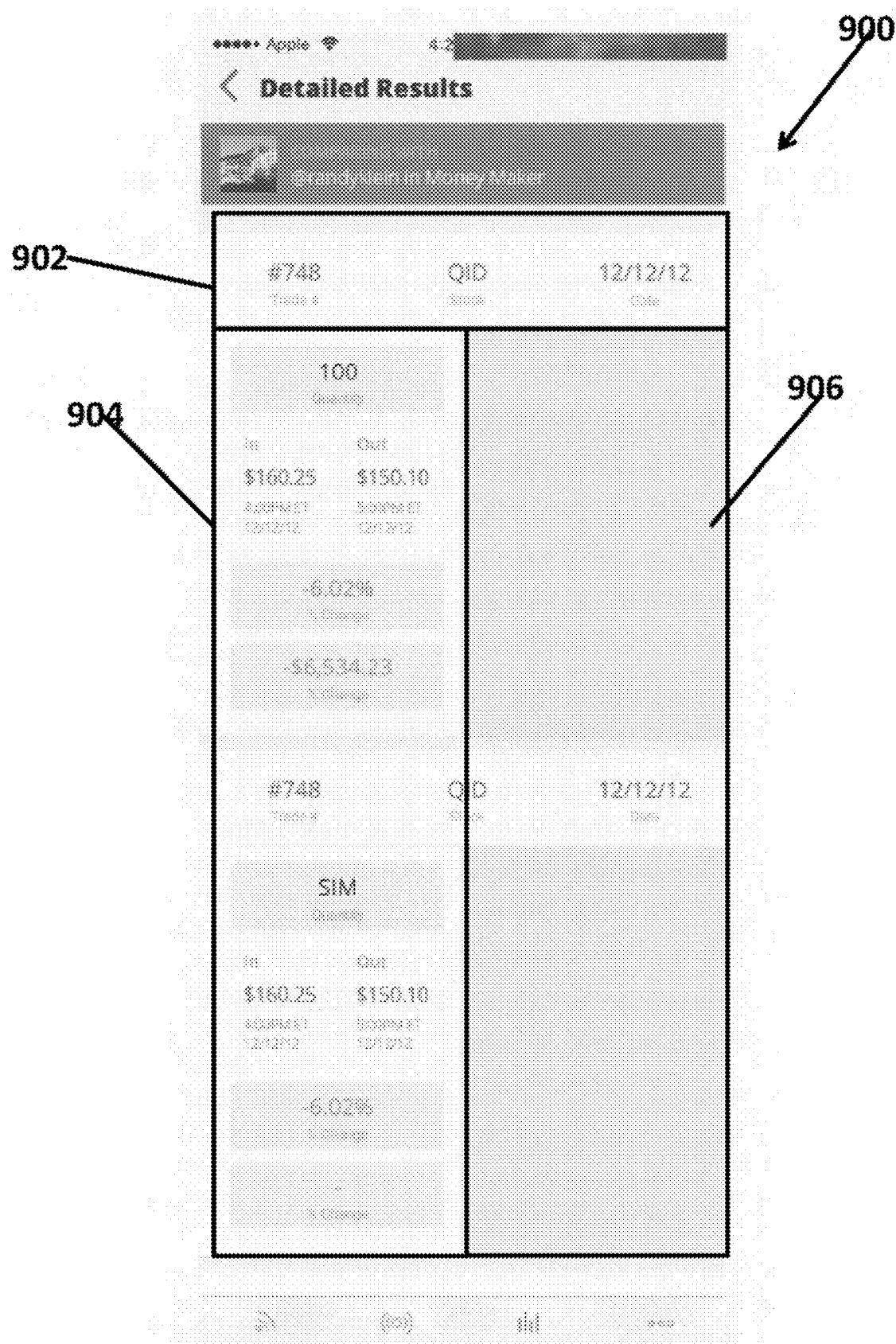
FIG. 9 illustrates an example of a result user interface generated by the trade exchange system displayed to an idea publisher showing the results of the trades in the system.

FIG. 9 illustrates an example of a result user interface 900 generated by the trade exchange system displayed to an idea publisher showing the results of the trades in the system. The example in FIG. 9 shows trade data for a particular trade for QID stock made on Dec. 12, 2012 in a trade display portion 902. The user interface has an idea publisher trade data portion 904 and a follower data portion 906 (that is blank in this user interface) side by side. The user interface shows the results of trades (including generated trade data) an idea publisher put though the system. Like FIG. 7, the user interface may also display buying and selling price (in and out) for the stock, the time of both of the in and out trades, the percentage change and the amount of change due to the trade. When a prospect wants to see the previous track record of a particular person or feed, they can be granted access to this data. Since there is no one to compare with (they are not current followers) then they only will see the performance of the idea producer.

Figure 11:
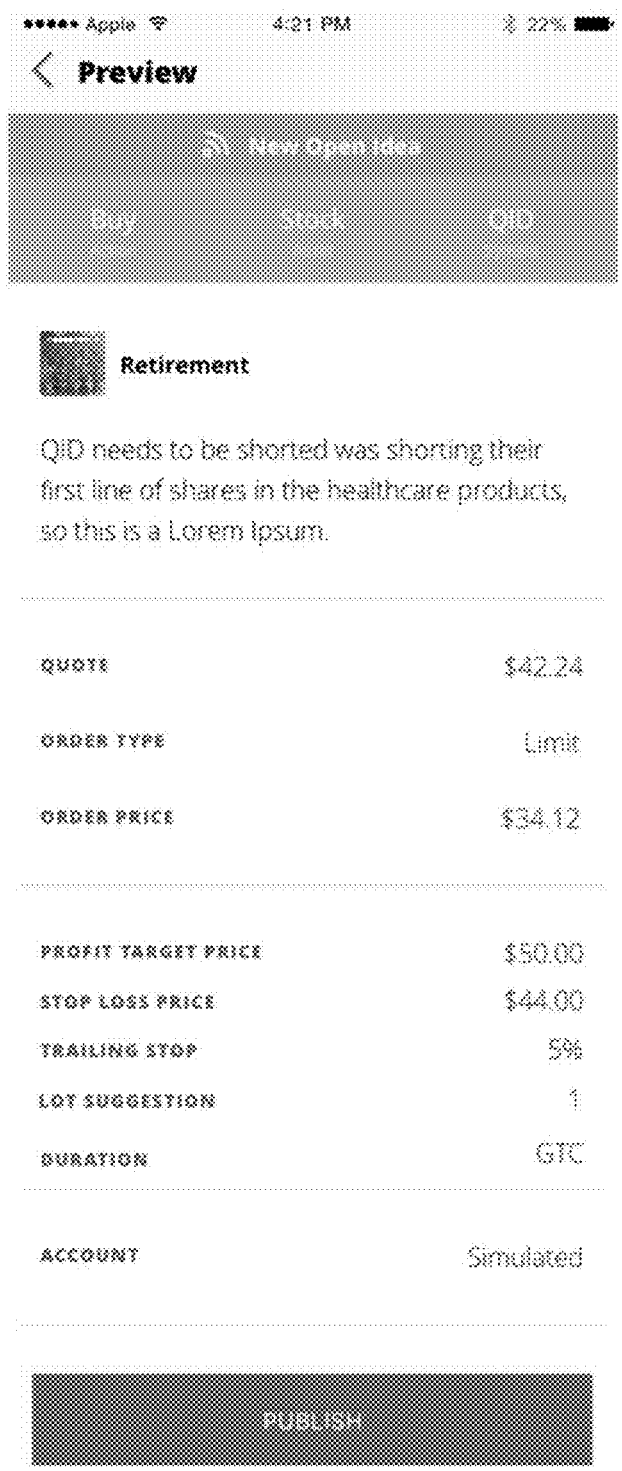
FIG. 11 illustrates an example of a user interface to display a new trade idea to a follower.
Figure 18:
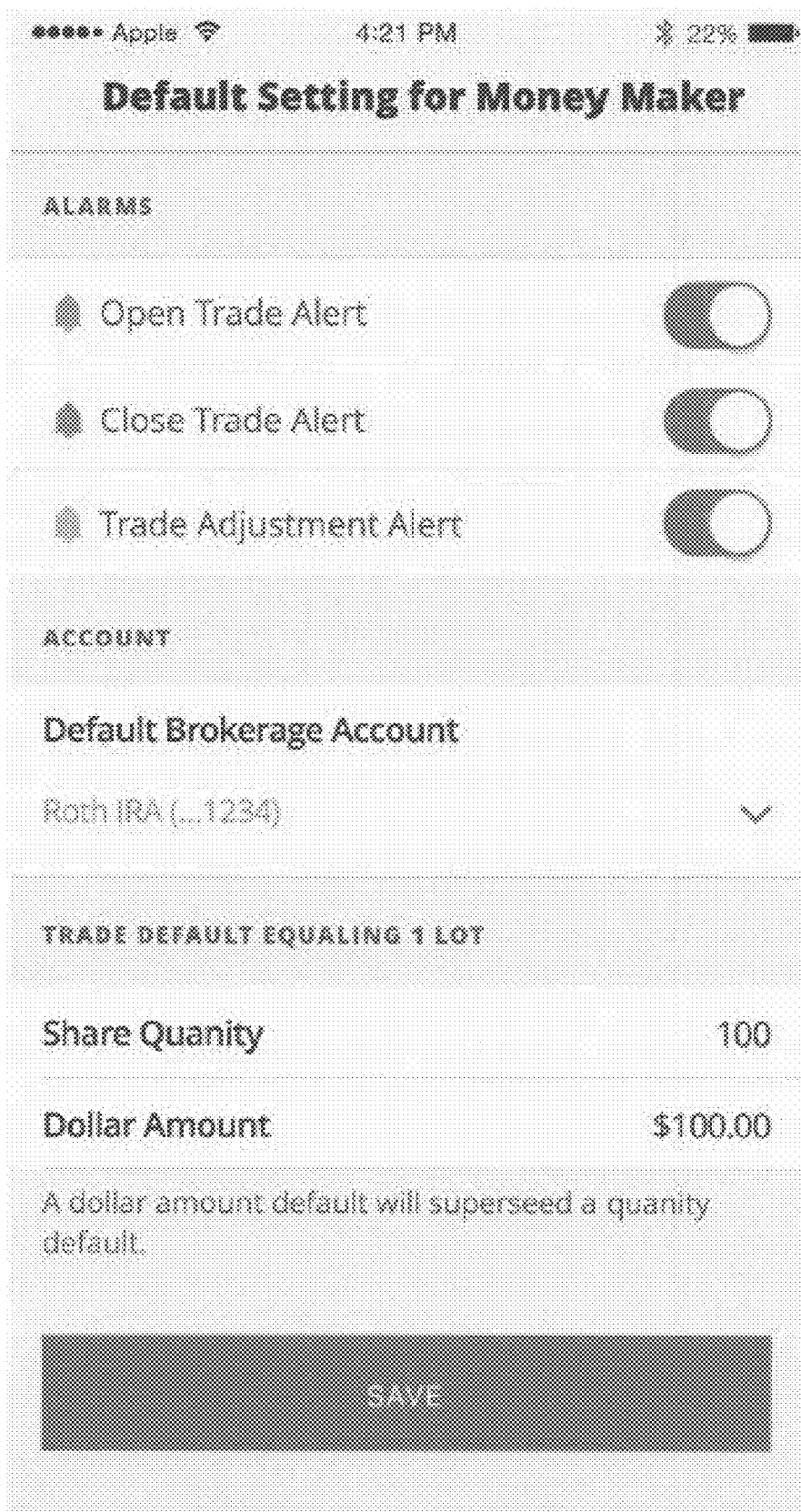
FIG. 18 illustrates an example of a user interface for setting/adjusting the user's default trade settings.

FIG. 10 illustrates an example of a user interface to create a new trade idea. In order to share an idea, an idea producer would select whom to share with (a Feed) along with the "trading" specifics and short description of the idea as shown in FIG. 10. They would then preview the information (in FIG. 11) to ensure that the trade idea is what they want to share. The idea producer may then publish the trade idea to the follower(s) using the publish button shown in FIG. 11. The Lot Suggestion is what tells the follower how much importance/money in comparison to a normal amount to put behind the idea. The system takes that along with the position cost and the users default investment size into account as it calculates the quantity a follower would use to trade with. An example of a user interface for setting/adjusting the user's default settings is shown in FIG. 18.

Figure 12:
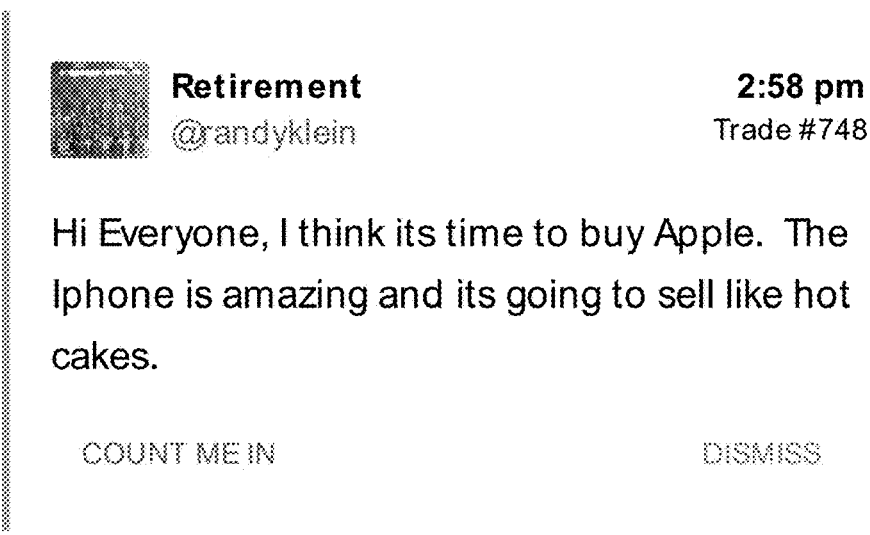
FIGS. 12-14 illustrate examples of a user interface for a follower to act on a trade idea and confirm the trade based on the trade idea.
Figure 13:
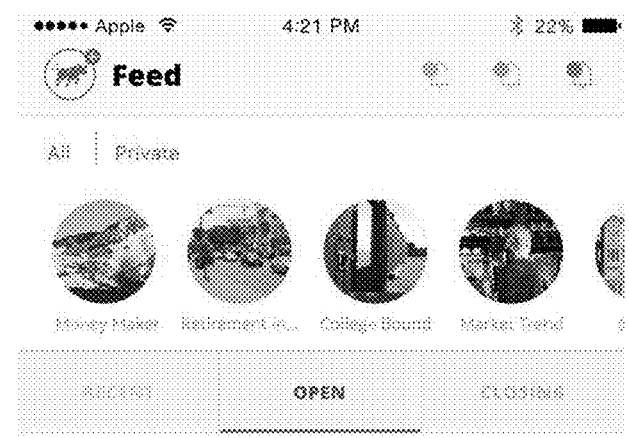
Figure 13:
Figure 13:

FIGS. 12-14 illustrate examples of a user interface for a follower to act on a trade idea and confirm the trade based on the trade idea. If a follower was part of a feed for the idea producer, they would have access to the ideas shared within the feed such as shown in FIG. 12. Each trade idea show up as a card as shown in FIG. 12 and if the user likes the idea and wants to act on the idea, the follower would hit "COUNT ME IN" link. FIG. 13 shows an example of a feed for an idea producer that has a plurality of trade ideas each of which may be acted on by each follower. If the follower wants to act on the trade idea, the follower may adjust the quantity if they wanted as shown in FIG. 14. The system would automatically adjust the quantity via calculation of the lot suggestion, defaults and position cost. For example, if the user default lot setting is 100 shares then if the idea publisher uses a 3 lot, for example, then the default quantity would be equal to Lot suggestion*lot default=quantity default for idea. If the default lot setting was a notional value, $1000.00 for example, the calculation for the idea default quantity may be Lot suggestion*default value=Idea Amount. The system may use the Idea amount and divide that by entry limit price (or margin requirement per share if going short) to calculate the idea default quantity. That is how the system, in real time, calculates the default shares needed for the idea. If the amount is not a whole number, the system may round down to the nearest whole share.

At that point users can hit "TAKE THIS TRADE" link in FIG. 14 to send the trade to the broker to execute the trade. This is an error free way to act on others ideas in 5-10 seconds vs—minutes if one had to read an email and log into E*TRADE to accomplish the same thing.

Figures 15, 16:
FIG. 15 illustrates an example of a user interface to display a position of a follower.
FIGS. 16-17 illustrate an example of a user interface to display and execute an exit strategy (close the position) for a trade for an idea producer or follower.

FIG. 15 illustrates an example of a user interface to display a position of a follower. This user interface is displayed when the user (follower or idea producer) has taken a position once an order is sent to the brokerage firm. All data shown in FIG. 15 is verified by the exchange through the API with the brokerage firm.

Figure 17:
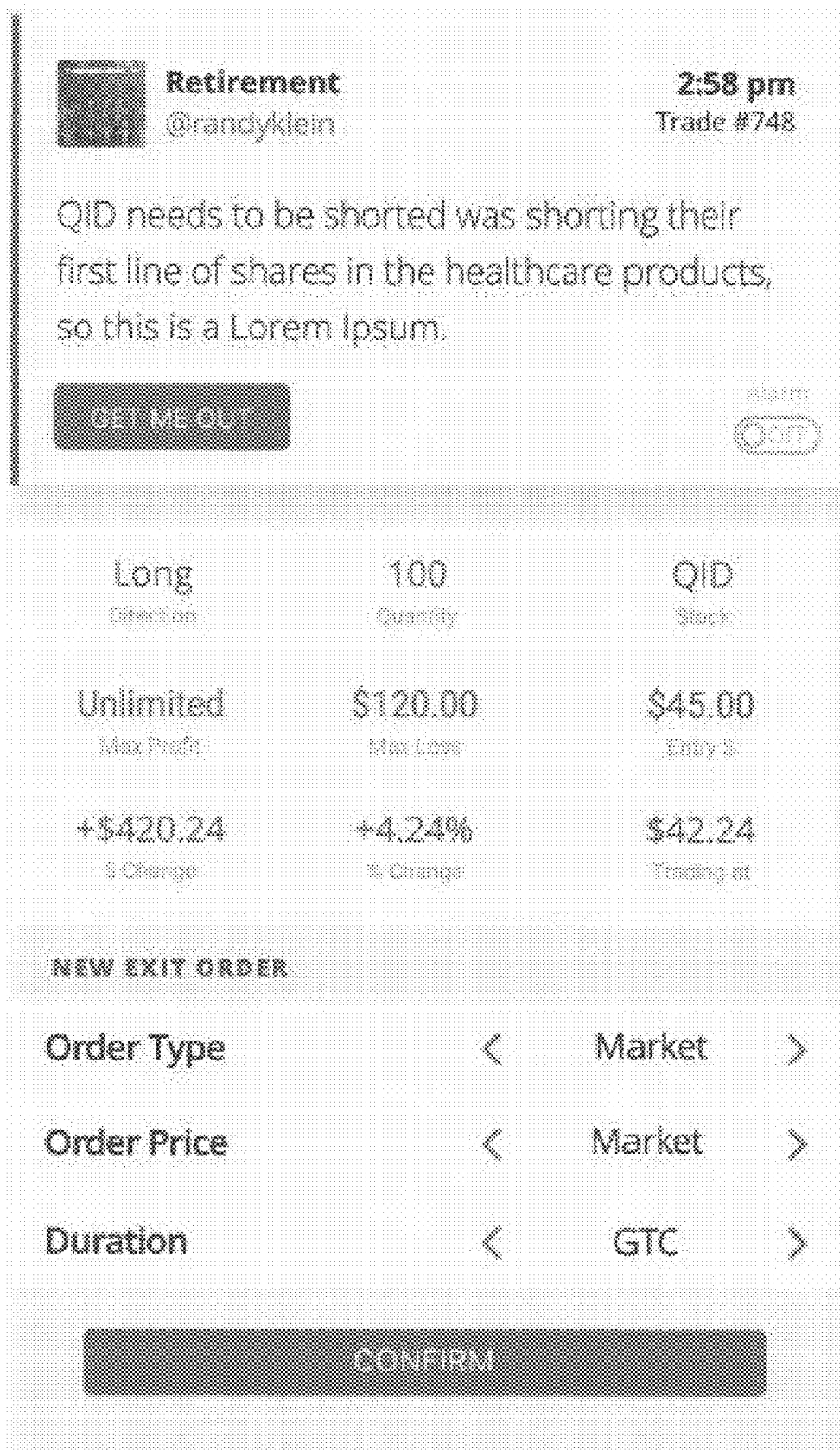

FIGS. 16-17 illustrate an example of a user interface to display and execute an exit strategy (close the position) for a trade for an idea producer or follower. The idea producer as well as the follower can exit the position at any time using the user interface in FIG. 16. If the idea producer exits the position those details are automatically shared with everyone that acted on the idea via a closing idea card as shown in FIG. 17. Followers of an idea would get a red closing idea card and can hit "GET ME OUT" if they want to continue following the idea producers guidance. Followers would then get all the details that the idea producer used to exit the trade that are also verified by the exchange using the APIs. Followers can hit "GET ME OUT", then "COMFIRM" which will send the request to the brokerage firm. That process takes seconds not minuets, which can save someone a lot of money and time.

The trade exchange system and method provides real-time access to investment ideas along with the associated untarnished trade data so that the system and method removes the "scam" element from most investment systems and the problems with those conventional investment systems as described above. In the system, the APIs and the generated trade data keeps both sides accountable. The system and method also provides untampered data from a variety of institutions via APIs and performs extremely difficult calculations, which include lot parameters for true IRR (internal rate of return) and accountability. The real time access to trade information and trade data provided by the system and method could not be done by hand in a short amount of time, especially as many trades come though since most investment ideas are time sensitive.

Without a system like the trade exchange system that is linked to the brokerage firms via APIs, real time access to the resulting figures of these very complex calculations would not be possible. The real time factor is what's needed to validate the claims made by those publishing investment/trading ideas because investment ideas are time sensitive. There is no way outside a system like the trade exchange to validate if an investment publisher is being completely truthful which occurs with the trade exchange system and method so that trust may be restored to the business of investment advice.

The calculations and determinations of the trade exchange system and method would be impossible to accomplish on paper with a pen due to the complicated calculations and the real time access for hundreds or thousands of followers (that would require hundreds/thousands of people having access to the login credentials of the idea producer, which isn't allowed by KYC mandate & AML law.) All online brokerages know when more than 1 person is making trades or accessing an account via web or mobile from different locations and will stop that activity as soon as they see it, per AML/KYC/compliance mandate.)

The trade exchange system and method validates the honest, profitable idea producer so that they can gain new customers. Without the true, untampered data and the results that come with it, it's difficult for idea producers to grow their business. Most people do not trust investment idea sources because most are not truthful (otherwise the system would not be in this situation). There isn't a system out there that produces real time untainted results (what they bought, when, how much and if they did with real money) immediately after a claim is made. The system validates all claims that pass through the system.

The trade exchange system and method also links to the "followers" accounts and provides the same transparency and accountability idea producers need in order to hold their customers accountable. Thus, the system and method validates, for the idea producer, if the follower is being truthful with their results. The trade exchange system and method may access trade results via API and ensure the data is untampered that gives the idea producers a tool to hold their customers accountable.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers, In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof, which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to; non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

I claim:

1. A method, comprising:
   receiving a trade idea from an idea producer that is distributed to a plurality of users, the trade idea including an asset, a trade action to take with respect to the asset and a price for a proposed trade of the asset;
   receiving a notification that one or more users and the idea producer have executed one or more trades in response to the trade idea using one or more brokerage entities;
   accessing, by a unique application programming interface engine of a computer trade exchange system, an account of each brokerage entity associated with the idea producer and the one or more users;
   gathering, by the unique application programming interface engine of the computer trade exchange system, real time trade data of the one or more executed trades for the trade idea, the real time trade data of the one or more executed trades including a time of each trade, a price incurred for each traded asset, and a number of shares of each traded asset;
   determining, by a trade data analyzer of the computer trade exchange system, one or more pieces of trade data using the gathered real time trade data of the one or more executed trades of the one or more users and the idea producer for the trade idea, the one or more pieces of trade data including a lot parameter for a true internal rate of return for the one or more executed trades, which of the one or more executed trades for the trade idea are profitable, and a percentage gain of the one or more executed trades for the trade idea; and
   generating, by a user interface engine of the computer trade exchange system, for each user that has executed one or more trades in response to the trade idea, a results user interface that displays the one or more executed trades of a particular user and the idea producer, and the determined one or more pieces of trade data of the particular user and the idea producer.

2. The method of claim 1, further comprising:
   retrieving the one or more pieces of trade data of the idea producer; and
   distributing the trade idea and the one or more pieces of trade data of the idea producer to the one or more users.

3. The method of claim 1, wherein accessing an account of a brokerage entity further comprises:
   retrieving a set of credentials of a brokerage account of the particular user; and
   accessing, using an application programming interface (API), the account of the brokerage entity using the retrieved set of credentials.

4. The method of claim 1, wherein the trade idea further comprises a lot sentiment for the asset.

5. The method of claim 1, wherein the trade idea further comprises a time constraint of the trade action.

6. The method of claim 1, wherein determining the one or more pieces of trade data further comprises determining a set of theoretical trade data, wherein the set of theoretical trade data further comprises a maximum loss of the one or more executed trades and a maximum profit of the one or more executed trades and wherein generating the results user interface further comprises displaying the determined set of theoretical trade data.

7. The method of claim 6, wherein determining the one or more pieces of trade data further comprises determining an actual set of trade data of the gathered real time trade data, and wherein generating the results user interface further comprises replacing the displayed determined set of theoretical trade data with the determined actual set of trade data and displaying the determined actual set of trade data.

8. The method of claim 7, wherein generating the results user interface for each user further comprises displaying the determined actual set of trade data that includes a percentage lost or won for the executed one or more trades of the particular user and the idea producer, a trade winner or loser for the executed one or more trades of the particular user and the idea producer, and a money gain or loss for the executed one or more trades of the particular user and the idea producer.

9. The method of claim 1, wherein the asset is one of a stock, a bond, a commodity, a security, an equity option, a mutual fund and a portfolio change.

10. A computer system, comprising:
    a processor coupled to a memory storing a plurality of lines of computer code, wherein the computer system is configured to:
      receive a trade idea from an idea producer that is distributed to a plurality of users, the trade idea including an asset, a trade action to take with respect to the asset and a price for a proposed trade of the asset;
      receive a notification that one or more users and the idea producer have executed one or more trades in response to the trade idea using one or more brokerage entities;
      access an account of each brokerage entity associated with the idea producer and the one or more users;
      gather real time trade data of the one or more executed trades for the trade idea, the real time trade data of the one or more executed trades including a time of each trade, a price incurred for each traded asset, and a number of shares of each traded asset;
      determine one or more pieces of trade data using the gathered real time trade data of the one or more executed trades of the one or more users and the idea producer for the trade idea, the one or more pieces of trade data including a lot parameter for a true internal rate of return for the one or more executed trades, which of the one or more executed trades for the trade idea are profitable and a percentage gain of the one or more executed trades for the trade idea; and
      generate, for each user that has executed one or more trades in response to the trade idea, a results user interface that displays the one or more executed trades of a particular user and the idea producer and the determined one or more pieces of trade data of the particular user and the idea producer.

11. The computer system of claim 10, wherein the computer system is further configured to:
    retrieve the one or more pieces of trade data of the idea producer; and distribute the trade idea and the one or more pieces of trade data of the idea producer to the one or more users.

12. The computer system of claim 10, wherein the computer system is further configured to:
retrieve a set of credentials of a brokerage account of the particular user; and
access, using an application programming interface (API), an account of a brokerage entity using the retrieved set of credentials.

13. The computer system of claim 10, wherein the trade idea further comprises a lot sentiment for the asset.

14. The computer system of claim 10, wherein the trade idea further comprises a time constraint of the trade action.

15. The computer system of claim 10, wherein the computer system is further configured to:
determine a set of theoretical trade data, wherein the set of theoretical trade data further comprises a maximum loss of the one or more executed trades and a maximum profit of the one or more executed trades; and
display the determined set of theoretical trade data in the results user interface.

16. The computer system of claim 15, wherein the computer system is further configured to:
determine an actual set of trade data of the gathered real time trade data; replace the displayed determined set of theoretical trade data with the determined actual set of determined trade data; and
display the determined actual set of trade data in the results user interface.

17. The computer system of claim 16, wherein the computer system is further configured to:
display the determined actual set of trade data that includes a percentage lost or won for the executed one or more trades of the particular user and the idea producer, a trade winner or loser for the executed one or more trades of the particular user and the idea producer, and a money gain or loss for the executed one or more trades of the particular user and the idea producer.

18. The computer system of claim 10, wherein the asset is one of: a stock, a bond, a commodity, a security, an equity option, a mutual fund, and a portfolio change.

19. A non-transitory computer-readable storage medium storing one or more programs configured to be executed by one or more processors of a computer system, the one or more programs including instructions for:
receiving a trade idea from an idea producer that is distributed to a plurality of users, the trade idea including an asset, a trade action to take with respect to the asset, and a price for a proposed trade of the asset;
receiving a notification that one or more users and the idea producer have executed one or more trades in response to the trade idea using one or more brokerage entities;
accessing an account of each brokerage entity associated with the idea producer and the one or more users;
gathering real time trade data of the one or more executed trades for the trade idea, the real time trade data of the one or more executed trades including a time of each trade, a price incurred for each traded asset, and a number of shares of each traded asset;
determining one or more pieces of trade data using the gathered real time trade data of the one or more executed trades of the one or more users and the idea producer for the trade idea, the one or more pieces of trade data including a lot parameter for a true internal rate of return for the one or more executed trades, which of the one or more executed trades for the trade idea are profitable, and a percentage gain of the one or more executed trades for the trade idea; and
generating, by a user interface engine of the computer trade exchange system, for each user that has executed one or more trades in response to the trade idea, a results user interface that displays the one or more executed trades of a particular user and the idea producer, and the determined one or more pieces of trade data of the particular user and the idea producer.

20. The non-transitory computer-readable storage medium of claim 19, further comprising:
retrieving the one or more pieces of trade data of the idea producer; and
distributing the trade idea and the one or more pieces of trade data of the idea producer to the one or more users.

21. The non-transitory computer-readable storage medium of claim 19, wherein accessing an account of a brokerage entity further comprises:
retrieving a set of credentials of a brokerage account of the particular user; and
accessing, using an application programming interface (API), the account of the brokerage entity using the retrieved set of credentials.

22. The non-transitory computer-readable storage medium of claim 19, wherein the trade idea further comprises a lot sentiment for the asset.

23. The non-transitory computer-readable storage medium of claim 19, wherein the trade idea further comprises a time constraint of the trade action.

24. The non-transitory computer-readable storage medium of claim 19, wherein determining the one or more pieces of trade data further comprises determining a set of theoretical trade data, wherein the set of theoretical trade data further comprises a maximum loss of the one or more executed trades and a maximum profit of the one or more executed trades, and wherein generating the results user interface further comprises displaying the determined set of theoretical trade data.

25. The non-transitory computer-readable storage medium of claim 24, wherein determining the one or more pieces of trade data further comprises determining an actual set of trade data of the gathered real time trade data, and wherein generating the results user interface further comprises replacing the displayed determined set of theoretical trade data with the determined actual set of trade data and displaying the determined actual set of trade data.

26. The non-transitory computer-readable storage medium of claim 25, wherein generating the results user interface for each user further comprises displaying the determined actual set of trade data that includes a percentage lost or won for the executed one or more trades of the particular user and the idea producer, a trade winner or loser for the executed one or more trades of the particular user and the idea producer, and a money gain or loss for the executed one or more trades of the particular user and the idea producer.

27. The non-transitory computer-readable storage medium of claim 19, wherein the asset is one of: a stock, a bond, a commodity, a security, an equity option, a mutual fund, and a portfolio change.

* * * * *